Sept. 22, 1936.                J. M. WALL                 2,055,021
                    INTERMITTENT DRIVE MECHANISM
                 Filed July 19, 1934          2 Sheets-Sheet 1
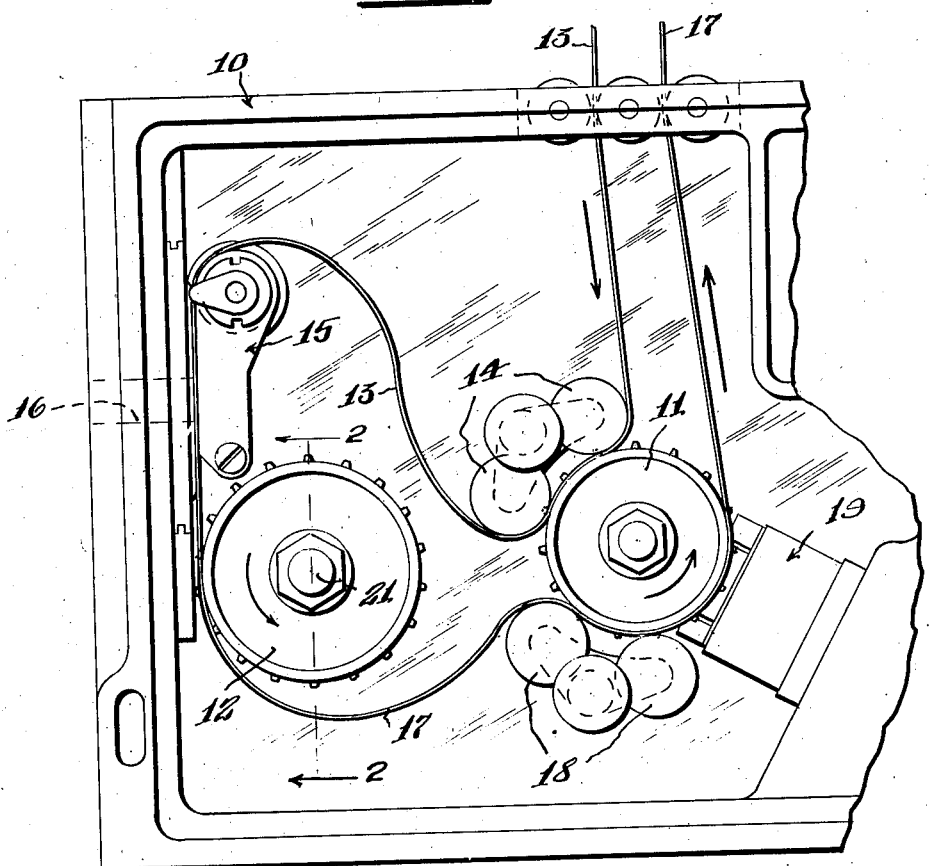
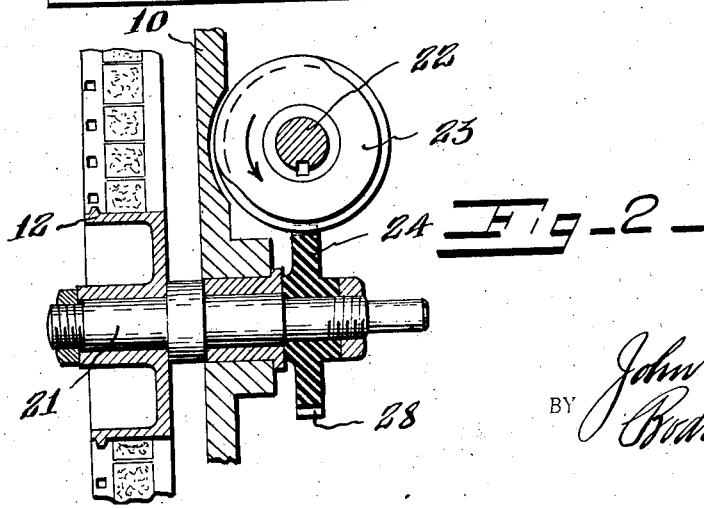
INVENTOR.
John M. Wall.
BY
ATTORNEYS.

Sept. 22, 1936.   J. M. WALL   2,055,021
INTERMITTENT DRIVE MECHANISM
Filed July 19, 1934   2 Sheets-Sheet 2
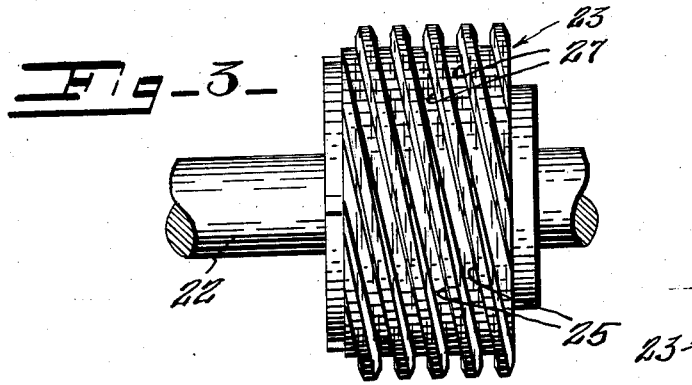
Fig-3-
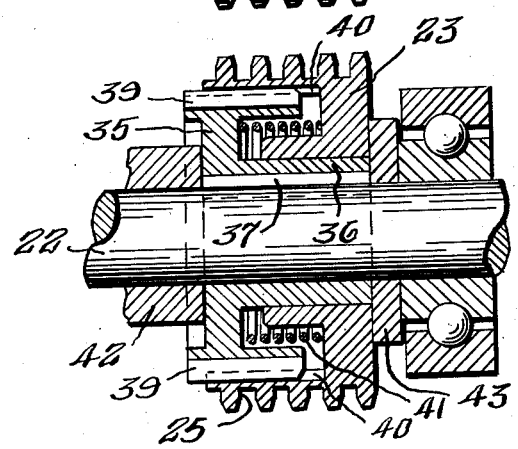
Fig-4-
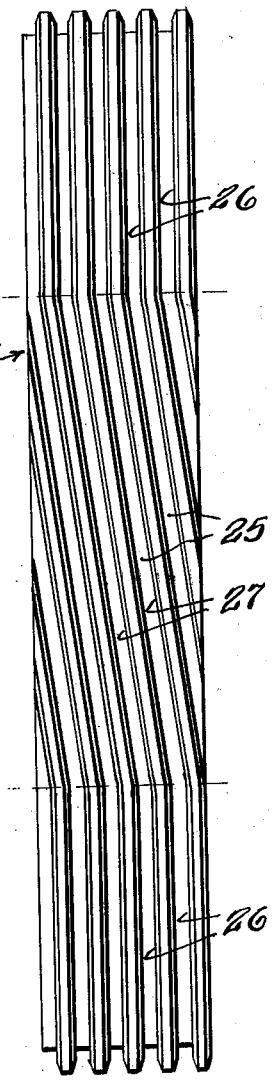
Fig-5-
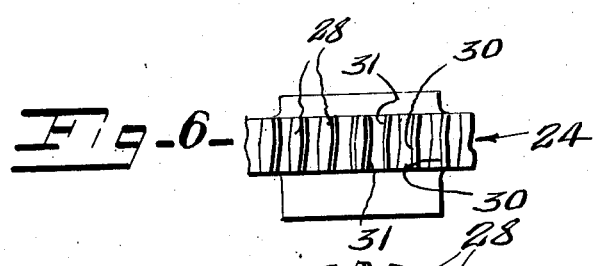
Fig-6-
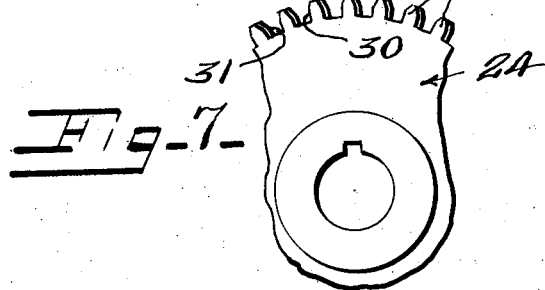
Fig-7-
INVENTOR.
John M. Wall
BY Bradell & Thompson
ATTORNEYS.

Patented Sept. 22, 1936

2,055,021

UNITED STATES PATENT OFFICE 2,055,021

INTERMITTENT DRIVE MECHANISM

John M. Wall, Syracuse, N. Y.

Application July 19, 1934, Serial No. 736,101

5 Claims. (Cl. 74—426)

This invention relates, in general, to a mechanism for effecting intermittent movement to a rotary driven member upon continued rotating of a driving member. More particularly, it relates to an intermittent drive assembly for effecting intermittent progressive movement of a film in a moving picture camera, or projector.

The invention has for an object, an intermittent drive mechanism composed of a minimum number of parts which are easily manufactured and so arranged relatively that the assembly, or unit, may be easily and quickly assembled, or disassembled.

The invention has for a further object, an intermittent drive mechanism operable to effect rotation of a driven member during a period of the cycle of revolution of a driving member, and to prevent rotation of the driven member during the remaining portion, or period, of the cycle of rotation of the driving member.

The invention has for a further object, an intermittent drive mechanism including a drive worm, and a driven gear meshing therewith, a portion of the worm being angular, and a portion straight, and the teeth of the driven gear being so formed as to accurately mesh with both portions of the worm gear.

The invention has for a further object, an intermittent drive mechanism operable to effect intermittent rotation of one member upon continuous rotation of another member, and including means for effecting such operation without noticeable vibration, or jar, to the driven member.

The invention has for a further object, an intermittent drive which operates with a minimum amount of noise.

The invention consists in the novel features and in the combinations and constructions hereinafter set forth and claimed.

In describing this invention, reference is had to the accompanying drawings in which like characters designate corresponding parts in all the views.

Figure 1 is a side elevation of a moving picture camera, with one side removed, showing the interior and arrangement of the film mechanism.

Figure 2 is a sectional view taken on line 2—2, Figure 1.

Figure 3 is a side elevation of the worm wheel of the intermittent drive mechanism.

Figure 4 is a sectional view of the mechanism shown in Figure 3.

Figure 5 is an enlarged development of the surface of the intermittent drive worm.

Figure 6 is a partial plan view of the intermittent driven gear.

Figure 7 is a partial elevation of the intermittent driven gear.

The invention consists, generally, in a driving worm wheel, a driven gear wheel meshing with and driven by the worm wheel, the worm wheel being provided with means for effecting intermittent rotation of the gear wheel.

It will be understood, by those familiar with the art, that some means must be employed in motion picture cameras, and projectors, for effecting a progressive movement of successive portions of the film in register with the aperture of the camera, or projector. This progressive movement is intermittent, not continuous. It is also necessary that the succeeding portion of the film be quickly moved into register with the aperture of the device, and held in its new position, while the aperture is open for either taking, or projecting, the picture, and during this time it is most essential that the film remain absolutely still. If there is any movement of the film, while the aperture is open, the image produced on the film will be blurred, or the picture produced on the screen will flicker.

It is also essential, particularly in connection with the sound, or talking moving picture, that the mechanism for intermittently moving the film shall make the minimum amount of noise. Heretofore, it has been common practice to effect the intermittent movement of the film with mechanism which inserts a pin, or pins, in the film, and moves the same the proper required distance to bring a frame of the film in register with the aperture. These are commonly known as pull-down pins. As soon as the pull-down pins have reached the length of their stroke, another pin, or set of pins, known as locking pins, enter perforations in the film and hold the same steady while the aperture is open. On account of the reciprocating movement of these various pins, the intermittent drive mechanism is comparatively intricate and extremely costly, it being very difficult to manufacture such a film drive due to the fact that the parts must be extremely accurate and well balanced in order to operate effectively at comparatively high speeds.

My intermittent drive mechanism does not employ any reciprocating parts whatever, and consists mainly of a worm driving wheel and a gear driven wheel. Referring to Figure 1, 10 designates the casing of a motion picture camera, on top of which is mounted the usual film magazines including reels from which the film is unwound and rewound. The mechanism for effecting the intermittent drive of the film over the aperture is contained within the casing 10, and consists generally of a feed or control sprocket 11, and as here shown, a drive sprocket 12. The unexposed film 13 is unwound from one of the upper reels, not shown, by rotation of the sprocket 11, which is provided with suitable teeth arranged to engage the usual perforations provided on one, or both sides of the film, the film being held in contact with the upper side of the sprocket 11 by means of idler rollers 14. The film then passes over and through a suitable tension unit 15 in register with the aperture 16.

The film is drawn through the tension device 15 by means of the sprocket 12, and the exposed portion 17 of the film is fed between the under side of the feed sprocket 11 and the idlers 18, from whence it is carried through the top of the casing 10 and rewound on one of the reels in the magazine portion of the camera. The sprockets 11, 12 are driven by the same motor and so synchronized, and the film so placed over the sprockets initially that a loop, or slack portion, of the film is maintained, and the intermittent movement of the film is effected in this loop portion. In other words, there is a slack amount of film between the sprocket 11 and the tension device 15, and between the sprocket 12 and the sprocket 11. As here shown, suitable apparatus 19 is arranged adjacent the sprocket 11 to impress the sound record on the margin of the exposed film 17.

The sprocket 12 is mounted upon one end of the shaft 21 and is secured thereto and rotatable therewith. Driving mechanism is connected to the shaft 21, and it is in this drive mechanism that I incorporate the mechanism for effecting the intermittent drive of the sprocket 12.

The drive mechanism (Figure 2) consists of a drive shaft 22 which is connected to an electric motor, or other suitable motive power, and on which is mounted a worm wheel 23. A gear 24 is secured to the shaft 21 and the shafts 21, 22 are so arranged relatively that the gear 24 meshes with and is driven by the worm 23.

The worm or thread 25 of the worm wheel 23 is not a true helix, but the thread of the worm 23 is so formed that a portion, or portions, of the thread or worm 25 extend straight, or parallel, to the end faces of the worm, while the remaining portion, or portions, are formed at an angle to the first-mentioned portions. That is, certain portions of the thread or groove 25 are formed with a lead, and other portions are formed with no lead. In Figure 5, the portions 26 are shown straight, or with no lead, and the portions 27 are in the form of a helix, or formed with a lead.

In order that the teeth 28 of the gear 24 may accurately mesh and coincide with both the straight and helical portion of the worm 25, the teeth 28 on the gear 24 are first cut parallel with the axis of the gear, or in the same manner as the teeth are cut on a regular spur gear. The teeth are then recut on an angle, as are the teeth of a worm gear, with the result that certain portions 30 of the teeth present surfaces parallel with the axis of the gear, and the remaining portion 31 of the tooth extend angularly. (See Figure 6.)

It will now be apparent that when the teeth 28 of the gear 24 are in mesh with the angular portion 27 of the worm 23, rotation of the worm 23 will be transmitted to the gear 24, shaft 21 and sprocket 12, thereby effecting movement of the film 13 through the tension device 15 and across the closed aperture 16, and when the teeth 28 of the gear 24 mesh with the straight portions 26 of the worm 23, no rotary movement will be transmitted to the gear 24 with the result that the sprocket 12 will stop and remain still until an angular portion 27 of the worm again meshes with the teeth of the gear 24.

This feature of my invention is particularly important when the intermittent device is used as a film feed in motion picture machines, or otherwise employed where it is essential that there be no rotary movement whatever while the teeth 28 are in engagement, or mesh with the straight portions 26 of the worm 25. It is obvious that the compound formation of the teeth 28 prevents any rotation of the gear 24 when the straight portions 30 of the teeth 28 are in engagement with the straight portion 26 of the worm. If the teeth 28 were cut angularly throughout their width, there would be excess clearance when the teeth 28 were in engagement with the straight portion 26 of the worm. With the compound formation of the teeth 28, adequate portions of the teeth are at all times in engagement with the worm, whether with the straight portion, or the angular portion, thereof.

It will be understood that the aperture 16 is provided with a suitable shutter mechanism so synchronized with the sprockets 11, 12, that the shutter remains closed while the film is in motion, and is opened when the film is still.

It will now be apparent that I have provided means for effecting intermittent rotation of the sprocket 12 without the use of any reciprocating members, or like mechanism. The quiet operation of worm gearing is familiar to all skilled in the art, and it is obvious that intermittent rotation of the sprocket 12 is effected without any noise whatever.

My intermittent drive mechanism is particularly adaptable to motion picture machines taking the sixteen millimeter film, the succeeding portions of which must be advanced approximately .300 of an inch, but it may also be adapted to motion pictures taking the thirty-five millimeter film; and with my intermittent drive mechanism the advancement of the film is accomplished without the resultant noise and inaccuracy of film feed mechanisms employing reciprocating parts.

Where it is desirable to avoid any impact that might result when the teeth 28 of the gear 24 engage either the straight portions 26, or the angular portions 27 of the worm 25, I provide means for dampening, or minimizing such impact.

Referring to Figure 4, the member 35 is provided with an elongated hub portion 36 which is keyed, or otherwise secured, to the shaft 22, as at 37. The periphery of the member 35, which is somewhat shorter than the hub portion 36, is provided with splines 39. The worm wheel 23 is mounted upon the hub 36, and is provided with internal splines 40 complemental to the splines 39 on the member 35. The member 35 and the worm wheel 23 are so proportioned relatively as to permit axial movement of the worm wheel 23. A spring 41 is interposed between the web of the worm wheel 23 and the web of the member 35, and normally maintains the member 35 and the worm wheel 23 in spaced apart relationship, as shown in Figure 4. The shaft 22 is provided with fixed collars 42, 43, against which the member 35 and the worm wheel 23 respectively abut. This mechanism is so assembled, relative to the direction of the pitch of the worm 25, that the end thrust, created by the teeth 28 of the gear 24, by entrance of teeth 28 into the angular portions 27 of the worm wheel 23, is absorbed by permissible movement of the worm 23 axially of the shaft 22 against the pressure of the spring 41. With this structure, any impact, or end thrust, transmitted by, or to, the worm wheel 23 is avoided, or dampened, to the extent where it is unnoticeable.

Before the gear 24 reaches the straight portion of the worm 23, the end thrust created by impact of teeth 28 with angular portion 27 of worm 23, has been overcome and the spring has returned worm 23 to its normal position; so that what has been accomplished is that the shock of the blow struck by operation of teeth 28 in the angular portion 27 of worm 23 has been absorbed and the worm returned to its normal position during that part of the cycle during which the film is being advanced from one frame, or exposure, to the next.

What I claim is:

1. An intermittent drive mechanism including a driving shaft and a driven shaft, a worm secured to and rotatable with the driving shaft and having a portion of the thread of the worm formed with a lead, and the remaining portion of the thread formed without a lead, a worm gear secured to the driven shaft and arranged in engagement with the worm, each side face of the teeth of the worm gear being cut with a portion extending axially of the gear, and a portion extending at an angle relative to the axis of the gear.

2. An intermittent drive mechanism including a driving shaft and a driven shaft, a worm secured to and rotatable with the driving shaft and having a portion of the thread of the worm formed with a lead, and the remaining portion of the thread formed without a lead, a worm gear secured to the driven shaft and arranged in engagement with the worm, each side face of the teeth of the worm gear being formed with a portion extending axially of the gear to receive that portion of the thread of the worm having no lead, and the remaining portion of the side face of the tooth of the worm gear being formed on an angle complemental to the lead portion of the thread of the worm.

3. An intermittent drive mechanism including a worm having a portion of the thread of the worm formed with a lead, and the remaining portion formed straight, a worm gear arranged in engagement with the worm, the side faces of the teeth of the worm gear being formed with a working face complemental to the straight portion of the thread of the worm, and the remaining portion of the side faces of the teeth being formed complemental to the angular portion of the thread of the worm.

4. An intermittent drive mechanism including a worm having a portion of the thread of the worm formed with a lead, and the remaining portion formed straight, a worm gear arranged in engagement with the worm, each side face of the teeth of the worm gear adjacent one side of the gear being formed with a working surface extending parallel to the axis of the worm gear, and the remaining surface adjacent the other side of the gear extending at an angle to said first mentioned surface.

5. An intermittent drive mechanism including a worm having a portion of the thread of the worm formed with a lead, and the remaining portion formed straight, a worm gear arranged in engagement with the worm, the adjoining side faces of the teeth of the worm gear having portions adjacent opposite sides of the gear extending parallel to the axis of the gear, and the remaining portions of said adjoining side faces extending at an angle to the axis of the gear.

JOHN M. WALL.